(12) United States Patent
Diab et al.

(10) Patent No.: US 7,921,310 B2
(45) Date of Patent: Apr. 5, 2011

(54) UNIFIED POWERED DEVICE (PD) CONTROLLER AND LAN ON MOTHERBOARD (LOM) IN A PERSONAL COMPUTING DEVICE (PCD)

(75) Inventors: Wael William Diab, San Francisco, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 888 days.

(21) Appl. No.: 11/797,616

(22) Filed: May 4, 2007

(65) Prior Publication Data
US 2008/0005433 A1 Jan. 3, 2008

Related U.S. Application Data

(60) Provisional application No. 60/816,879, filed on Jun. 28, 2006.

(51) Int. Cl.
G06F 1/00 (2006.01)
H04L 12/28 (2006.01)
(52) U.S. Cl. .................. 713/300; 713/310; 370/419
(58) Field of Classification Search .................. 713/300, 713/310; 370/419
See application file for complete search history.

(56) References Cited

U.S. PATENT DOCUMENTS
5,889,381 A 3/1999 Wakefield
(Continued)

FOREIGN PATENT DOCUMENTS
WO WO 2005/036815 A1 4/2005

OTHER PUBLICATIONS 802.3af™, IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI), IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

Primary Examiner — Vincent T Tran
(74) Attorney, Agent, or Firm — Sterne, Kessler, Goldstein & Fox, P.L.L.C.

(57) ABSTRACT

A Power-over-Ethernet (PoE) communication system dynamically provides power and data communications over a communications link. In a computing environment made up of one or more personal computing devices (PCD) and/or one or more powered devices (PD), power source equipment (PSE) determines an allocated amount of power to be supplied to each device. The personal computing devices include a unified LAN-On-Motherboard (LOM) that combines the functionality of a powered device (PD) controller of a conventional PD and a LOM of a conventional personal computing device into a single unified subsystem. This allows the personal computing devices to use the existing hardware architecture and software architecture, such as software drivers and Access Protocol Interfaces (API), with few modifications to implement PoE. Further, the personal computing devices provide the power source equipment with access to some of the operational parameters, such as the voltage and the current of the personal computing device, using a communication via the data link layer, also referred to as layer two in the Open System Interconnection (OSI) networking model. Additionally, the power source equipment may dynamically manage the power requirements for the personal computing devices using the data link layer.

28 Claims, 10 Drawing Sheets

U.S. PATENT DOCUMENTS

| | | |
|---|---|---|
| 6,473,608 B1 | 10/2002 | Lehr et al. |
| 6,764,343 B2 | 7/2004 | Ferentz |
| 6,909,943 B2 | 6/2005 | Lehr et al. |
| 6,986,071 B2 | 1/2006 | Darshan et al. |
| 7,046,983 B2 | 5/2006 | Elkayam et al. |
| 7,117,272 B2 | 10/2006 | Rimboim et al. |
| 7,143,299 B1 | 11/2006 | Rubinstein et al. |
| 7,203,849 B2 | 4/2007 | Dove |
| 7,231,535 B2 | 6/2007 | Le Creff et al. |
| 7,320,078 B2 | 1/2008 | Balestriere |
| 7,337,336 B2 | 2/2008 | Ferentz et al. |
| 7,340,325 B2 | 3/2008 | Sousa et al. |
| 7,343,506 B1 | 3/2008 | Fenwick |
| 7,363,525 B2 | 4/2008 | Biederman et al. |
| 7,368,798 B2 | 5/2008 | Camagna et al. |
| 7,454,641 B2 | 11/2008 | Connor et al. |
| 7,549,067 B2 | 6/2009 | Tolliver |
| 2005/0097378 A1* | 5/2005 | Hwang .................. 713/320 |
| 2005/0136989 A1* | 6/2005 | Dove .................. 455/572 |
| 2005/0276023 A1 | 12/2005 | Zansky et al. |
| 2006/0215680 A1* | 9/2006 | Camagna ............... 370/419 |
| 2006/0242458 A1* | 10/2006 | Feldman et al. ............ 714/14 |
| 2006/0244462 A1 | 11/2006 | McCosh et al. |
| 2006/0251179 A1* | 11/2006 | Ghoshal .................. 375/257 |
| 2007/0041577 A1* | 2/2007 | Ghoshal et al. ............ 379/413 |
| 2007/0074052 A1 | 3/2007 | Hemmah et al. |
| 2007/0079151 A1* | 4/2007 | Connor et al. .......... 713/300 |
| 2007/0110360 A1 | 5/2007 | Stanford |
| 2007/0220280 A1* | 9/2007 | Karam et al. ............ 713/300 |
| 2007/0257780 A1 | 11/2007 | Schindler |
| 2008/0005600 A1 | 1/2008 | Diab et al. |
| 2008/0005601 A1 | 1/2008 | Diab |
| 2008/0005602 A1 | 1/2008 | Diab et al. |
| 2008/0016263 A1 | 1/2008 | Diab et al. |
| 2008/0052546 A1 | 2/2008 | Schlinder |
| 2009/0265563 A1* | 10/2009 | Camagna et al. ......... 713/300 |

* cited by examiner

US 7,921,310 B2

UNIFIED POWERED DEVICE (PD) CONTROLLER AND LAN ON MOTHERBOARD (LOM) IN A PERSONAL COMPUTING DEVICE (PCD)

CROSS REFERENCE TO RELATED APPLICATIONS

This patent application claims the benefit of U.S. Provisional Patent Application No. 60/816,879, filed Jun. 28, 2006, entitled "Power over Ethernet for a Laptop Computer," which is incorporated herein by reference in its entirety.

BACKGROUND OF THE INVENTION

1. Field of the Invention

The present invention generally relates to personal computing devices (e.g., personal or laptop computers) in a Power over Ethernet (PoE) system, and more specifically to unifying the functionality of a powered device (PD) controller with the functionality of a LAN on Motherboard (LOM) into a single unified subsystem in a personal computing device.

2. Related Art

Ethernet communications provide high speed data communications over a communications link between two communication nodes that operate according the IEEE 802 Ethernet Standard. The communications medium between the two nodes can be twisted pair wires for Ethernet, or other types of communications medium that are appropriate. Power over Ethernet (PoE) communication systems provide power and data communications over a common communications link. More specifically, a power source device (e.g., power source equipment (PSE)) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

The PSE device is often a data switch. Typically, a PSE on a switch is called an endspan device. The switch is typically a networking bridge device with data ports that can additionally have routing capability. The switch could have as little as two data ports or as many as 400 or more data ports. It may have two or more rows of data ports, where a data port in an input row of data ports can be switched to any one of the data ports in an output row of data ports. Each data port can include a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Typical PD devices that utilize PoE include Internet Protocol (IP) phones (Voice over IP (VoIP) phones), wireless access points, etc. Personal computing devices, such as personal or laptop computers, are another example of PD devices. The integration of PoE into a conventional personal computing device raises several issues that must be overcome. For example, the hardware (H/W) architecture of the conventional personal computing requires extensive modification to access the PoE subsystem. Likewise, implementation of PoE requires widespread modification of the software (S/W) architecture, such as software drivers and Access Protocol Interfaces (API) to provide some examples, of the conventional personal computing. Therefore, what is needed is a personal computing device that solves the addresses the issues of integrating PoE into a conventional personal computing device.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
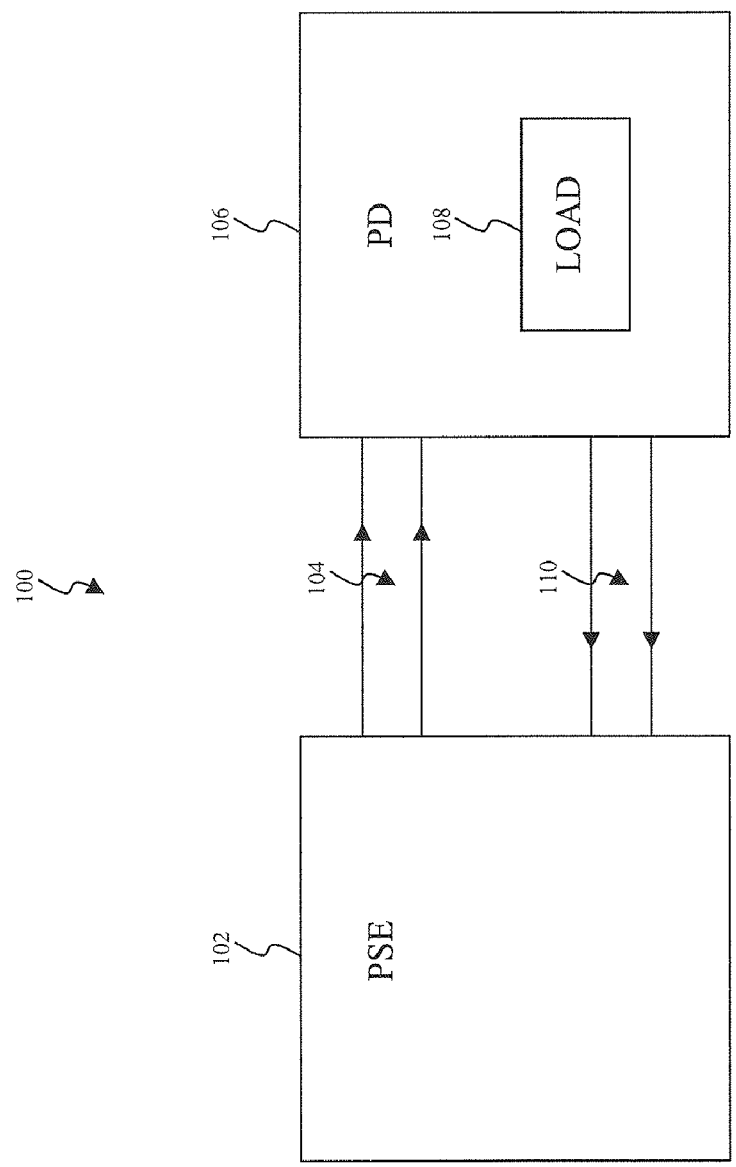
FIG. 1 is a block diagram of a conventional Power over Ethernet (PoE) system.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

FIG. 1 is a block diagram of a conventional Power over Ethernet (PoE) system. More specifically, FIG. 1 illustrates a high level diagram of a conventional Power over Ethernet (PoE) system 100 that provides both DC power and data communications over a common data communications medium. Referring to FIG. 1, the power source equipment 102 provides DC power over conductors 104, 110 to a powered device (PD) 106 having a representative electrical load 108. The power source equipment 102 provides PoE according to a known PoE standard, such as the IEEE 802.3af™ standard, the IEEE 802.3at™ standard, a legacy PoE transmission, and/or any suitable type of PoE transmission standard to provide some examples. The power source equipment 102 and PD 106 also include data transceivers that operate according to a known communications standard, such as a 10 BASE-T, a 100 BASE-TX, a 1000 BASE-T, a 10 GBASE-T, and/or any other suitable communication standard to provide some examples. More specifically, the power source equipment 102 includes a physical layer device on the PSE side that transmits and receives high speed data with a corresponding physical layer device in the PD 106, as will be discussed further below. Accordingly, the power transfer between the power source equipment 102 and the PD 106 occurs simultaneously with the exchange of high speed data over the conductors 104, 110. In one example, the power source equipment 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
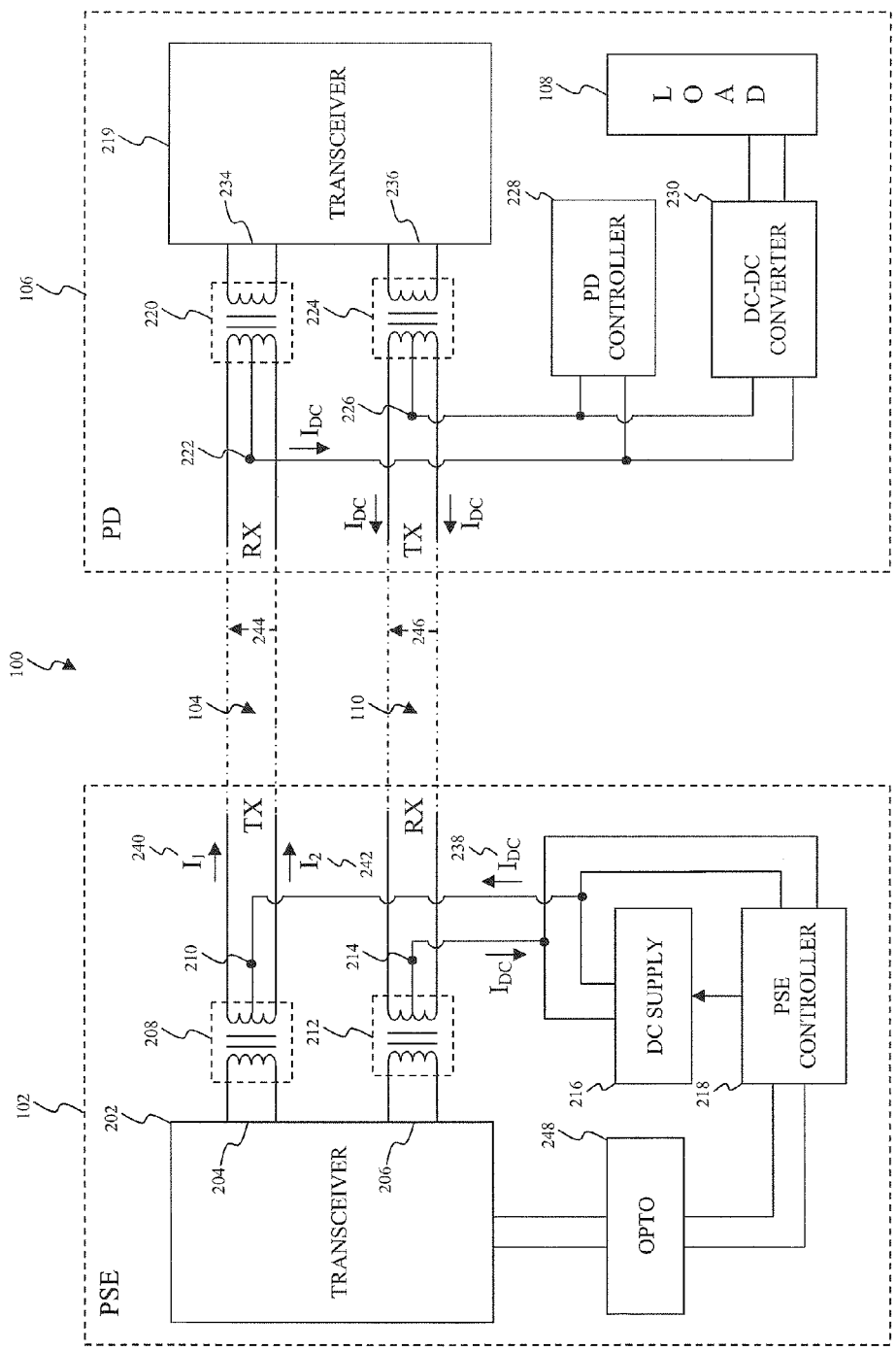
FIG. 2 illustrates a more detailed figure of the conventional power transfer from Power source equipment (PSE) to a Powered Device (PD) in a conventional PoE communications system.

FIG. 2 illustrates a more detailed figure of the conventional power transfer from Power source equipment (PSE) to a Powered Device (PD) in a conventional PoE communications system. More specifically, FIG. 2 provides a more detailed circuit diagram of the PoE system 100, where the power source equipment 102 provides power for PoE to PD 106 over conductor pairs 104 and 110. The power source equipment 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The power source equipment 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the power source equipment 102 and the PD 106 occurs simultaneously with the DC power supply described above. Accordingly, a first communication signal 244 and/or a second communication signal 246 are simultaneously differentially carried via the conductor pairs 104 and 110 between the power source equipment 102 and the PD 106. It is important to note that the communication signals 244 and 246 are differential signals that ideally are not effected by the DC power transfer.

Figure 3:
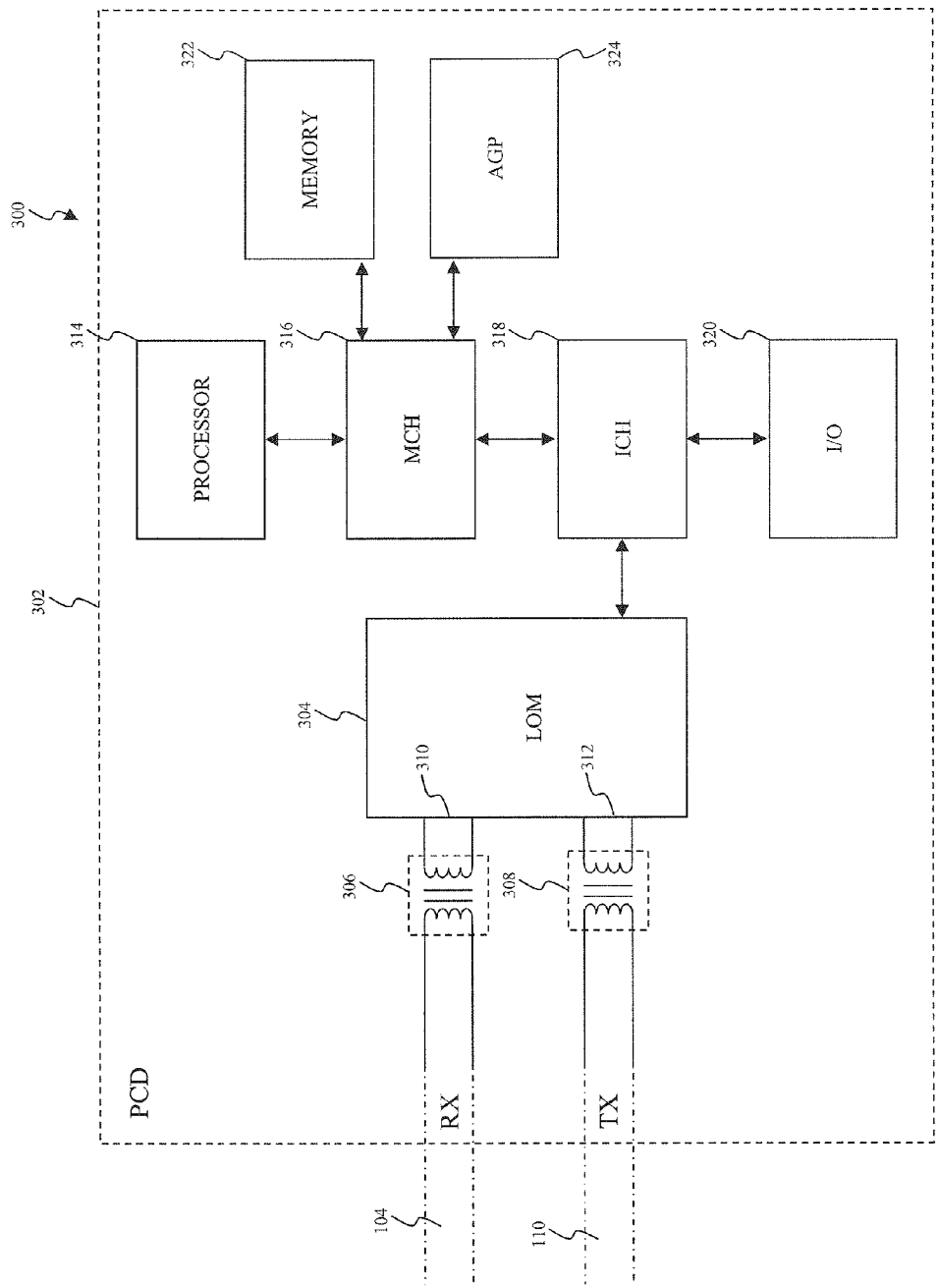
FIG. 3 illustrates a block diagram of a motherboard of a conventional personal computing device.

FIG. 3 illustrates a block diagram of a motherboard of a conventional personal computing device. As shown in FIG. 3, a conventional personal computing device 300 includes a motherboard 302. The motherboard 302 includes, among other chips/modules, a Local Area Network (LAN)-On-Motherboard (LOM) module 304, a processor 314, a Memory Controller Hub (MCH) 316, an Input/Output Controller Hub (ICH) 318, a super input/output (I/O) module 320, a memory 322, and a Advanced Graphics Port (AGP) 324.

The motherboard 302 includes the LOM module 304 to handle network connections. The LOM module 304 includes communication circuits, such as Ethernet circuits to provide an example, within a motherboard rather than a separate network adapter. The LOM module 304 includes full duplex transmit and receive capability through differential transmit port 312 and differential receive port 310. A transformer 306 couples high speed data between a first conductor pair 104 and the receive port 310. Likewise, a second transformer 308 couples high speed data between the transmit port 312 and a second conductor pair 110.

High speed data is passed between the LOM module 304 and the Input/Output Controller Hub 318. The Input/Output Controller Hub 318 may be referred to as a south bridge. The Input/Output Controller Hub 318 is normally given responsibility for slower devices that may include a Peripheral Component Interconnect (PCI) bus, an Industry Standard Architecture (ISA) bus, a System Management Bus (SMBus), a Direct Memory Access (DMA) controller, an Interrupt controller, an Integrated Drive Electronics (IDE) controller, a Real Time Clock, Power management, and/or a Nonvolatile BIOS memory to provide some examples. The Input/Output Controller Hub 318 may also include support for a keyboard, a mouse, and serial ports, but normally these devices are attached through the super I/O module 320. The super I/O module 320 provides connections to peripheral devices that may include a CD-ROM drive a printer, the mouse, the keyboard, a monitor, an external Zip drive, a scanner, an internal modem, a video controller, or any other suitable peripheral device to provide some examples.

The Memory Controller Hub 316, which may be referred to as a north bridge, is responsible for controlling communication between the processor 314, the Input/Output Controller Hub 318, the memory 322, and the Advanced Graphics Port (AGP) 324. The Memory Controller Hub 316 may also contain an integrated video controller (not shown). The Memory Controller Hub 316 may determine the number, speed, and type of processor for the processor 314 and the amount, speed, and type of memory for the memory 322. The Input/Output Controller Hub 318 and the Memory Controller Hub 316 may be combined into a single chip to form a single-chip design. The memory 322 contains storage for instructions and data and may include, but is not limited to, static RAM (SRAM), dynamic RAM (DRAM), Synchronous DRAM (SDRAM), non-volatile RAM (NVRAM), or Rambus DRAM (RDRAM) to provide some examples.

The processor 314 interprets computer program instructions and processes data. The processor 314 may include, but is not limited to, control circuits for executing instructions, an arithmetic logic unit (ALU) for manipulating data, and registers for storing processor status and a small amount of data to provide some examples. The processor 314 also executes or runs an operating system (O/S) of the personal computing device.

Figure 4:
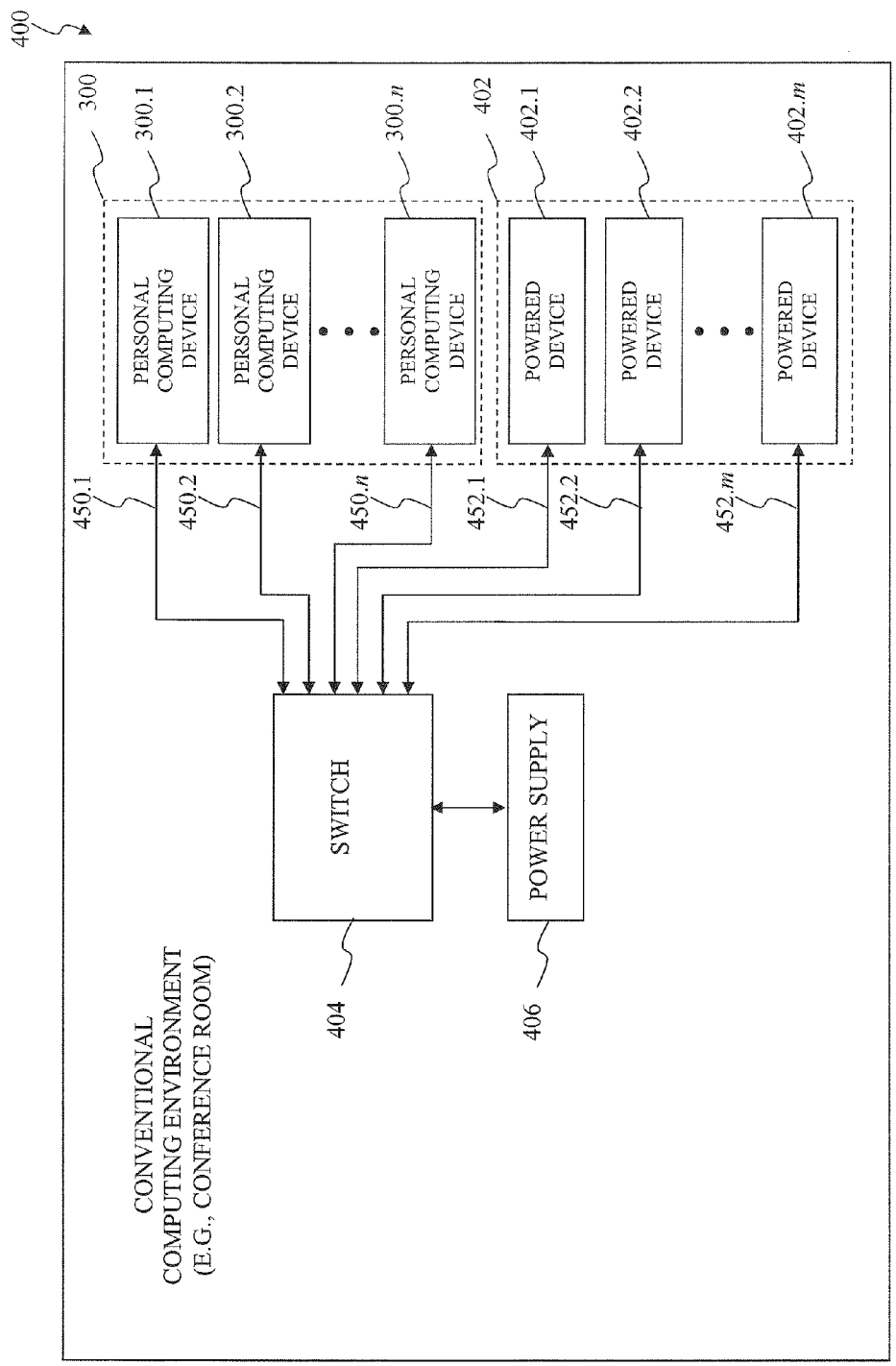
FIG. 4 illustrates a Power over Ethernet (PoE) configuration in a computing environment, using a conventional personal computing device.

FIG. 4 illustrates a Power over Ethernet (PoE) configuration in a computing environment, using a conventional personal computing device. A computing environment 400 includes conventional personal computing devices 300.1 through 300.n, hereinafter referred to as the conventional personal computing devices 300 and powered devices 402.1 through 402.m, hereinafter referred to as the powered devices 402. Computing environment 400 can be a conference room, for example, or any other environment in which the conventional personal computing devices 300 are networked. The conventional personal computing devices 300 include any suitable device, such as a desktop computer, that receives power from a source other than a communications link but is capable of data communications over the communications link.

As shown in FIG. 4, a network switch 404 and/or a power supply 406 provides data communications to the conventional personal computing devices 300 and PoE and data communications to the powered devices 402 via a network switch 404. The network switch 404 may be any networking switch that is capable of providing PoE and data communications to the powered devices 402. The network switch 404 includes one or more data ports to provide PoE and data communications to the powered devices 402. The network switch 404 may have as little as two data ports or as many as 400 or more data ports.

The network switch provides data communications to the conventional personal computing devices 300 through a corresponding interface 450.1 through 450.n, hereinafter referred to as the interface 450, whereas the network switch provides PoE and data communications to the powered devices 402 through a corresponding interface 452.1 through 452.n, hereinafter referred to as the interface 452. The powered devices 402 may include, but are not limited to Internet Protocol (IP) phones (Voice over IP (VoIP) phones), wireless access points, powered devices, such as personal or laptop computers. Those skilled in the art(s) will recognize that the powered devices 402 may include any suitable device that is capable of receiving power and data communications over a communications link without departing from the spirit and scope of the invention. Those skilled in the art(s) will recognize that the interface 450 and/or the interface 452 may include any communication link that can handle PoE, such as various types of Ethernet cabling, for example.

Figure 5:
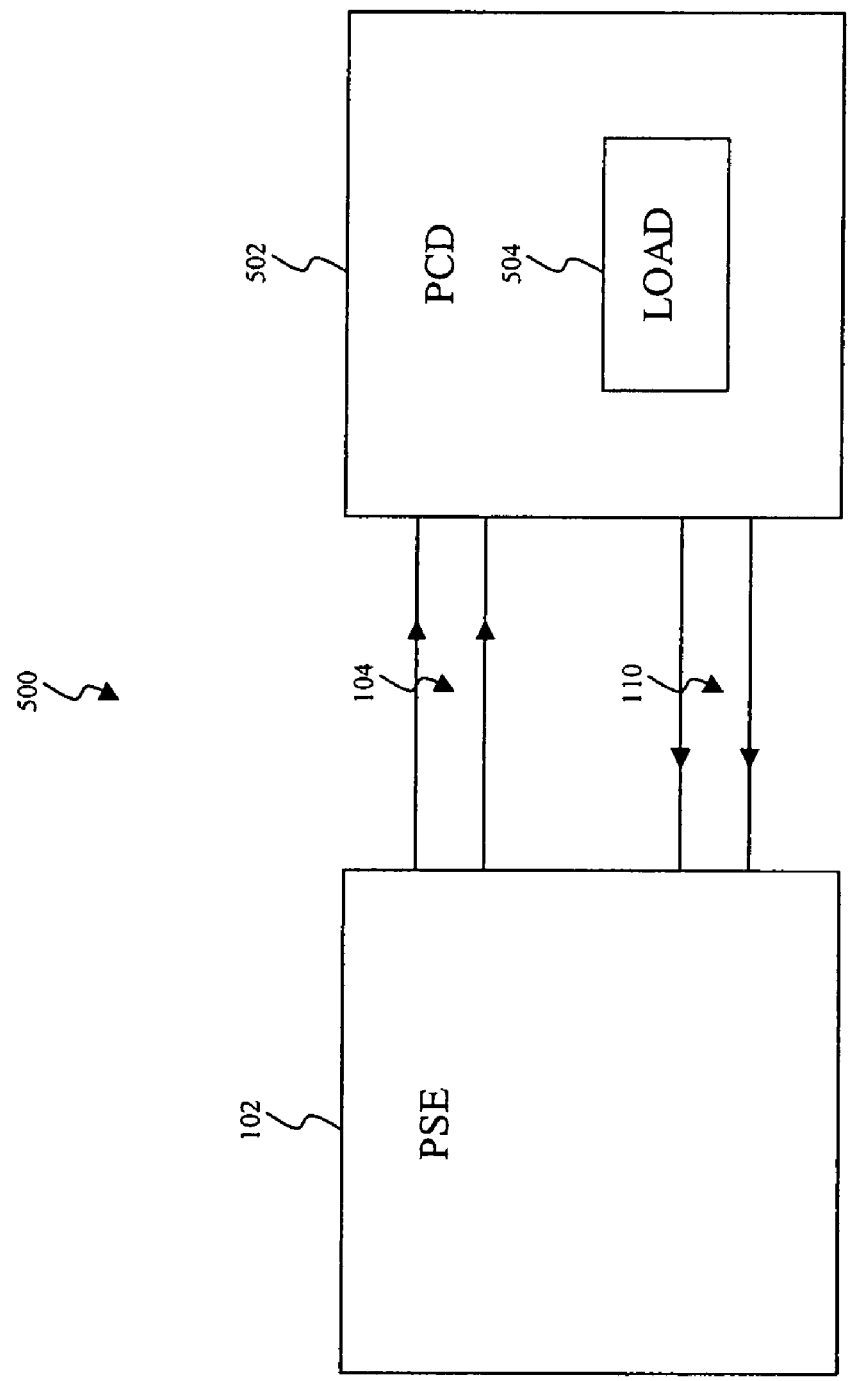
FIG. 5 is a block diagram of a Power over Ethernet (PoE) system according to an exemplary embodiment of the present invention.

FIG. 5 is a block diagram of a Power over Ethernet (PoE) system according to an exemplary embodiment of the present invention. As shown in FIG. 5, the power source equipment 102 provides PoE and data communications over conductors 104, 110 to a personal computing device (PCD) 502 having a representative electrical load 504. The power source equipment 102 provides PoE according to a known PoE standard, such as the IEEE 802.3af™ standard, an IEEE 802.3at™ standard, a legacy PoE transmission, and/or any suitable type of PoE transmission standard to provide some examples. Those skilled in the art(s) will recognize that the personal computing device 502 as described herein can include a personal computer, a laptop, a handheld computing device, or any other powered device that is capable of receiving PoE and data communications over a communications link without departing from the spirit and scope of the invention.

The personal computing device 502 also includes data transceivers that operate according to a known communications standard, such as a 10 BASE-T, a 100 BASE-TX, a 1000 BASE-T, a 10 GBASE-T, and/or any other suitable communication standard to provide some examples. More specifically, the power source equipment 102 includes a physical layer device (PHY) on the power source equipment side that transmits and receives high speed data with a corresponding physical layer device in the personal computing device 502, as will be discussed further below. Accordingly, the power transfer between the power source equipment 102 and the personal computing device 502 occurs simultaneously with the exchange of high speed data over the conductors 104, 110.

Figure 6A:
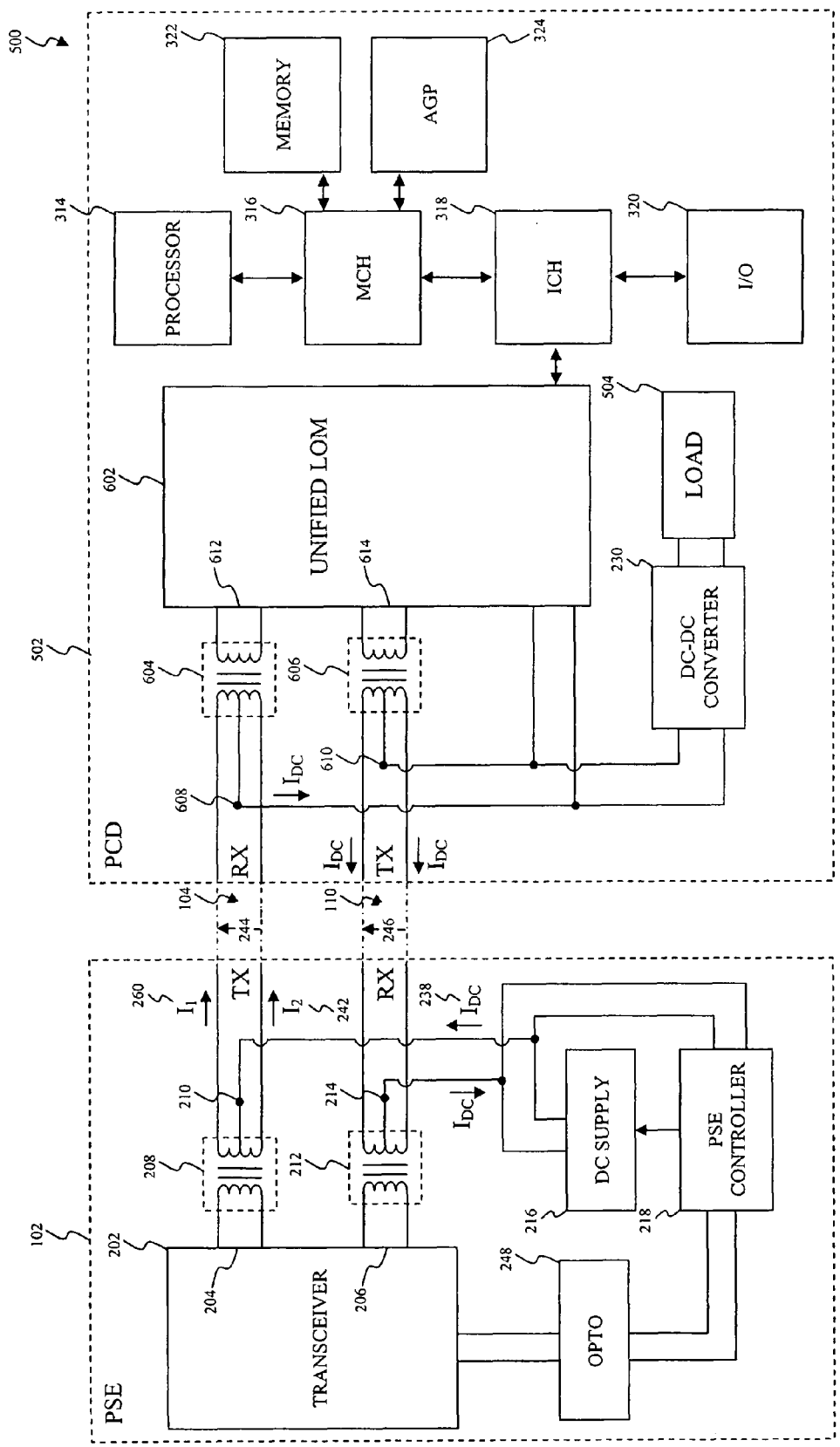
FIG. 6A illustrates a more detailed figure of the power transfer from a power source equipment (PSE) to a personal computing device (PCD) according to an exemplary embodiment of the present invention.

FIG. 6A illustrates a more detailed figure of the power transfer from a power source equipment (PSE) to a personal computing device (PCD) according to an exemplary embodiment of the present invention. More specifically, FIG. 6A provides a more detailed circuit diagram of the PoE system 500, where the power source equipment 102 provides PoE and data communications to the personal computing device (PCD) 502 over conductor pairs 104 and 110. In this exemplary embodiment, the power source equipment 102 provides power for PoE and for data communications over conductor pairs 104 and 110 in a substantially similar manner as previously described in FIG. 1 and FIG. 2.

As shown in FIG. 6A, the personal computing device 500 includes a unified LOM 602. The unified LOM 602 combines the functionality of the PD controller 228, as discussed in FIG. 2, and the functionality of the LOM module 304, as discussed in FIG. 3, into a single unified subsystem. As such, the unified LOM 602 may be implemented using a single chip or die or multiple chips or dies.

Figure 6C:
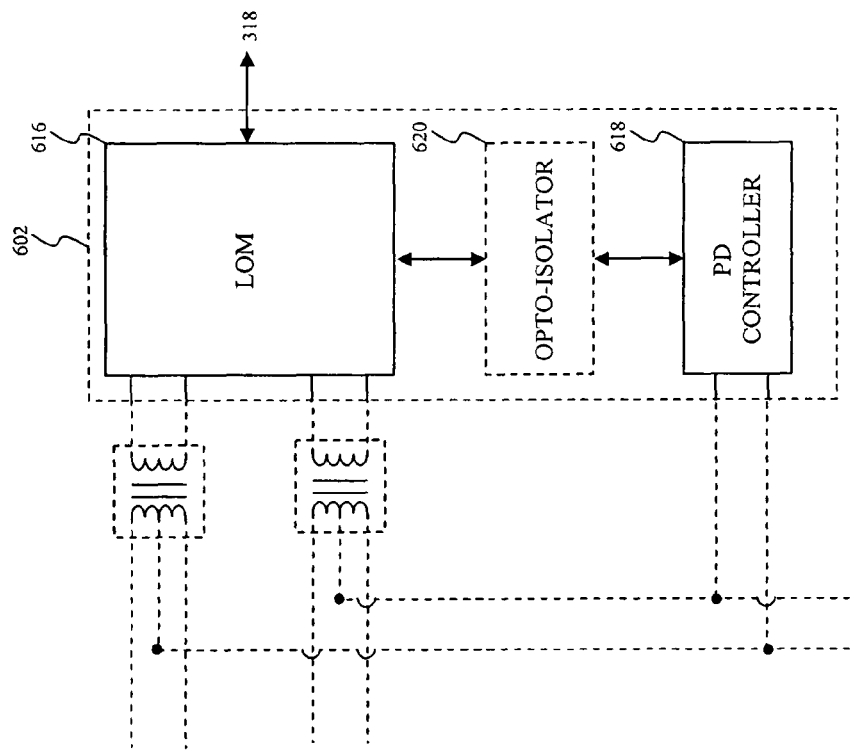
FIG. 6C illustrates a more detailed figure of a unified Local Area Network(LAN)-On-Motherboard (LOM) according to another exemplary embodiment of the present invention.
Figure 6B:
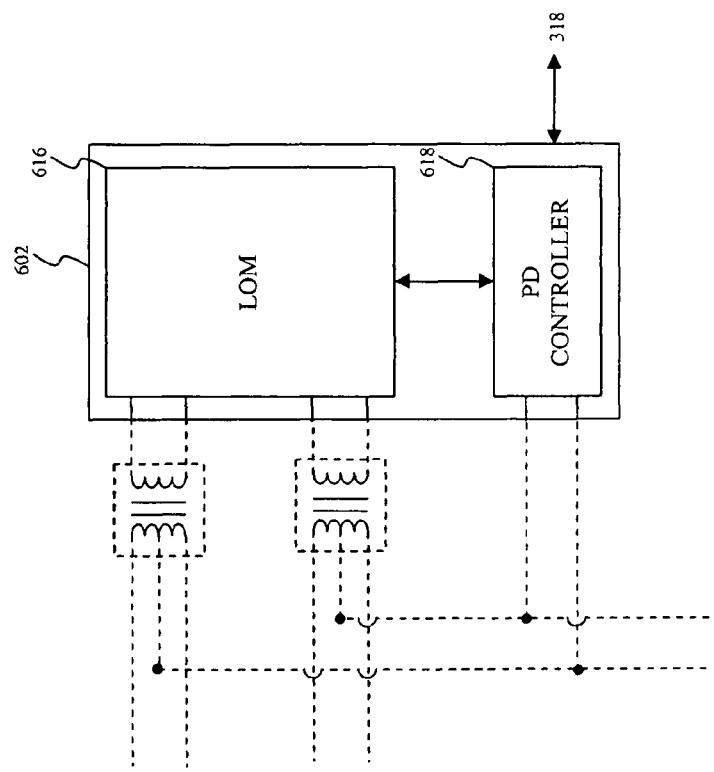
FIG. 6B illustrates a more detailed figure of a unified Local Area Network(LAN)-On-Motherboard (LOM) according to an exemplary embodiment of the present invention.

FIG. 6B illustrates a more detailed figure of a unified Local Area Network(LAN)-On-Motherboard (LOM) according to an exemplary embodiment of the present invention. As shown in FIG. 6B, the unified LOM 602 includes a LOM 616 and a PD controller 618. In this exemplary embodiment, the LOM 616 and the PD controller 618 are implemented on a single die or on a single chip.

It is often desirable to implement the unified LOM 602 using multiple dies or multiple chips by fabricating the LOM 616 and the PD controller 618 on multiple dies or within multiple chips. For example, the PD controller 618 may be implemented using a 100V process, whereas the LOM 616 may be implemented using a 10V process.

FIG. 6C illustrates a more detailed figure of a unified Local Area Network(LAN)-On-Motherboard (LOM) according to another exemplary embodiment of the present invention. In this exemplary embodiment, the LOM 616 and the PD controller 618 are implemented on multiple dies or as multiple chips. In this exemplary embodiment, an optional opto-isolator 620 may be used to bypass the isolation boundary between the LOM 616 and the PD controller 618.

Referring back to FIG. 6A, the unified LOM 602 may be viewed as a single unified subsystem including the LOM module 616 and the PD controller 618. As such, the unified LOM 602 seamlessly integrates PoE into a personal computing device by managing PoE through existing structure of the personal computing device, such as software drivers and Access Protocol Interfaces (API), to provide some examples. In other words, the LOM 602 includes programmable registers and messages that may be read using existing software drivers and Access Protocol Interfaces of the personal computing device, thereby eliminating a need to develop new drivers and APIs.

As discussed in FIG. 2, the PD controller 228 monitors the voltage and current on the PD side of the PoE configuration and provides the necessary impedance signatures during initialization. Similarly, the unified LOM 602 monitors operational parameters, such as the voltage and the current of the personal computing device and provides the necessary impedance signatures during initialization, so that the PSE controller 218 will recognize the personal computing device as a valid PoE device, and be able to classify its power requirements. It is desirable to communicate these operational parameters to the power source equipment 102 using a communication via the data link layer, also referred to as layer two in the Open System Interconnection (OSI) networking model. Those skilled in the art(s) will recognize that these operational parameters may be communicated to the power source equipment 102 using any suitable means such as a physical layer, also referred to as a layer one, communication without departing from the spirit and scope of the invention.

Figure 7:
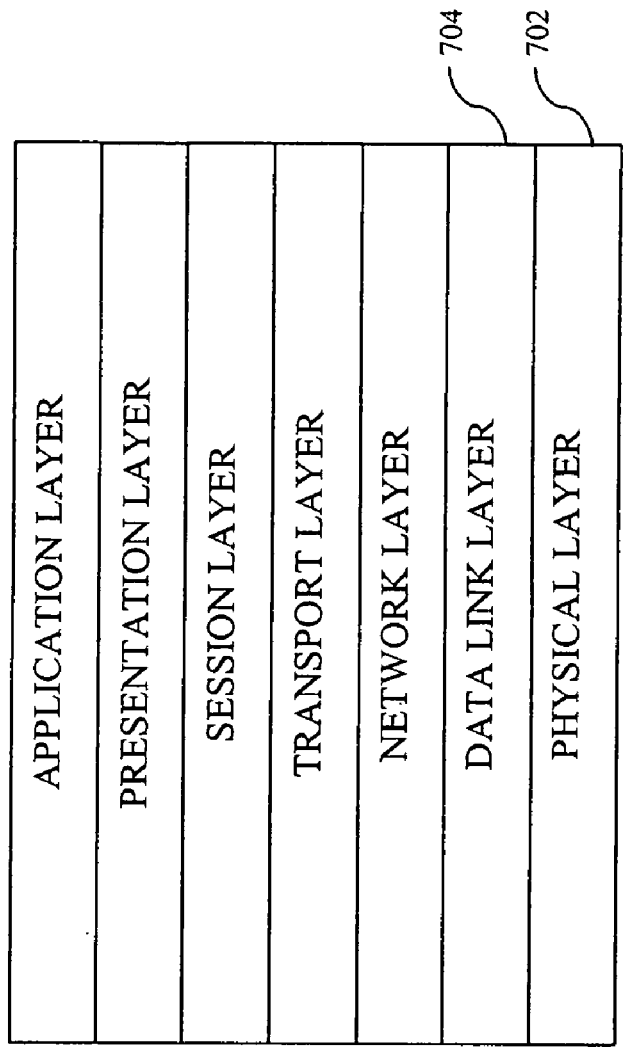
FIG. 7 illustrates the Open System Interconnection (OSI) networking model, a part of which is incorporated into embodiments of the present invention.

FIG. 7 illustrates the Open System Interconnection (OSI) networking model, a part of which is incorporated into embodiments of the present invention. The OSI networking model is a layered, abstract description for communications and computer network protocol design. The OSI networking model is well known in the art.

In the conventional PoE System, such as PoE system 100, the PD 106 communicates using a Physical Layer 702. Referring back to FIG. 7, the Physical Layer 702, also referred to as layer one, defines all the electrical and physical specifications for devices such as layout of pins, voltages, and cable specifications to provide some examples. The Physical Layer 702 may establish and terminate a connection to a communications medium. The Physical Layer 702 only provides one-way, one-time (static) communication and can be very slow.

On the other hand, the unified LOM 602 communicates via the Data Link Layer 704. Whereas the Physical Layer 702 conveys a bit stream (including electrical impulses, light, or radio signals, for example) through a network at the electrical and mechanical level, providing a hardware means of sending and receiving data on a carrier, the Data Link Layer 704 conveys data packets that include encoded bits and can provide transmission protocol knowledge and management including handling data errors.

As shown in FIG. 7, the Data Link Layer 704, also referred to as layer two of the seven-layer OSI networking model, 704 provides the functional and procedural means to transfer data between network entities and to detect and correct errors that might occur in the Physical Layer 702. Interfacing directly with the unified LOM 602 using the Data Link Layer 704 allows the operating system to capture parametric information, such as line voltage or line current to provide some examples, that otherwise is unavailable when using only the Physical Layer 702. The Data Link Layer 704 provides the interface for the unified LOM 602 to communicate parametric information. In other words, the Data Link Layer 704 provides the personal computing devices 502 the ability to read the parametric information, such as line voltage or line current to provide some examples, at the physical port and to communicate the parametric information to the power source equipment 102 via a communication link. Communication via the Data Link Layer 704 allows a subsystem to manage PoE to be implemented within the unified LOM 602 to reduce latency, real-time demand and unnecessary host processor bandwidth needed to manage PoE functionality.

Referring back to FIG. 6A, a data communication is passed between the unified LOM 602 and the ICH module 318. More specifically, the LOM module 616 has full duplex transmit and receive capability through differential transmit port 614 and differential receive port 612. A transformer 604 couples high speed data between the first conductor pair 104 and the receive port 612. Likewise, a second transformer 606 couples high speed data between the transmit port 614 and the second conductor pair 110. The respective transformers 604 and 606 pass the high speed data to and from the unified LOM 602, but isolate any low frequency or DC voltage from the sensitive transceiver data ports.

The transformer 604 includes primary and secondary windings, where the secondary winding (on the conductor side) includes a center tap 608. Likewise, the second transformer 606 includes primary and secondary windings, where the secondary winding (on the conductor side) includes a center tap 610. The center taps 608 and 610 supply the power for PoE carried over conductors 104 and 110 to the representative load 504 of the personal computing devices 502, where the load 504 represents the dynamic power draw needed to operate personal computing devices 502. A DC-DC converter 230 may be optionally inserted before the load 504 to step down the voltage as necessary to meet the voltage requirements of the personal computing devices 502. Further, multiple DC-DC converters 230 may be arrayed in parallel to output multiple different voltages (3 volts, 5 volts, 12 volts) to supply different loads 404 of the personal computing devices 502.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the center tap 608 to reform the direct current ($I_{DC}$) 238 so as to power the personal computing devices 502. On return, the direct current ($I_{DC}$) 238 flows from the personal computing devices 502 through the second center tap 610, and divides for transport over conductor pair 110. The return DC current recombines at the second center tap 214, and returns to the DC power supply 216. As discussed above, data transmission between the power source equipment 102 and the personal computing devices 502 occurs simultaneously with the DC power supply described above. Accordingly, a first communication signal 244 and/or a second communication signal 246 are simultaneously differentially carried via the conductor pairs 104 and 110 between the power source equipment 102 and the personal computing devices 502. It is important to note that the communication signals 244 and 246 are differential signals that ideally are not effected by the DC power transfer.

Figure 8:
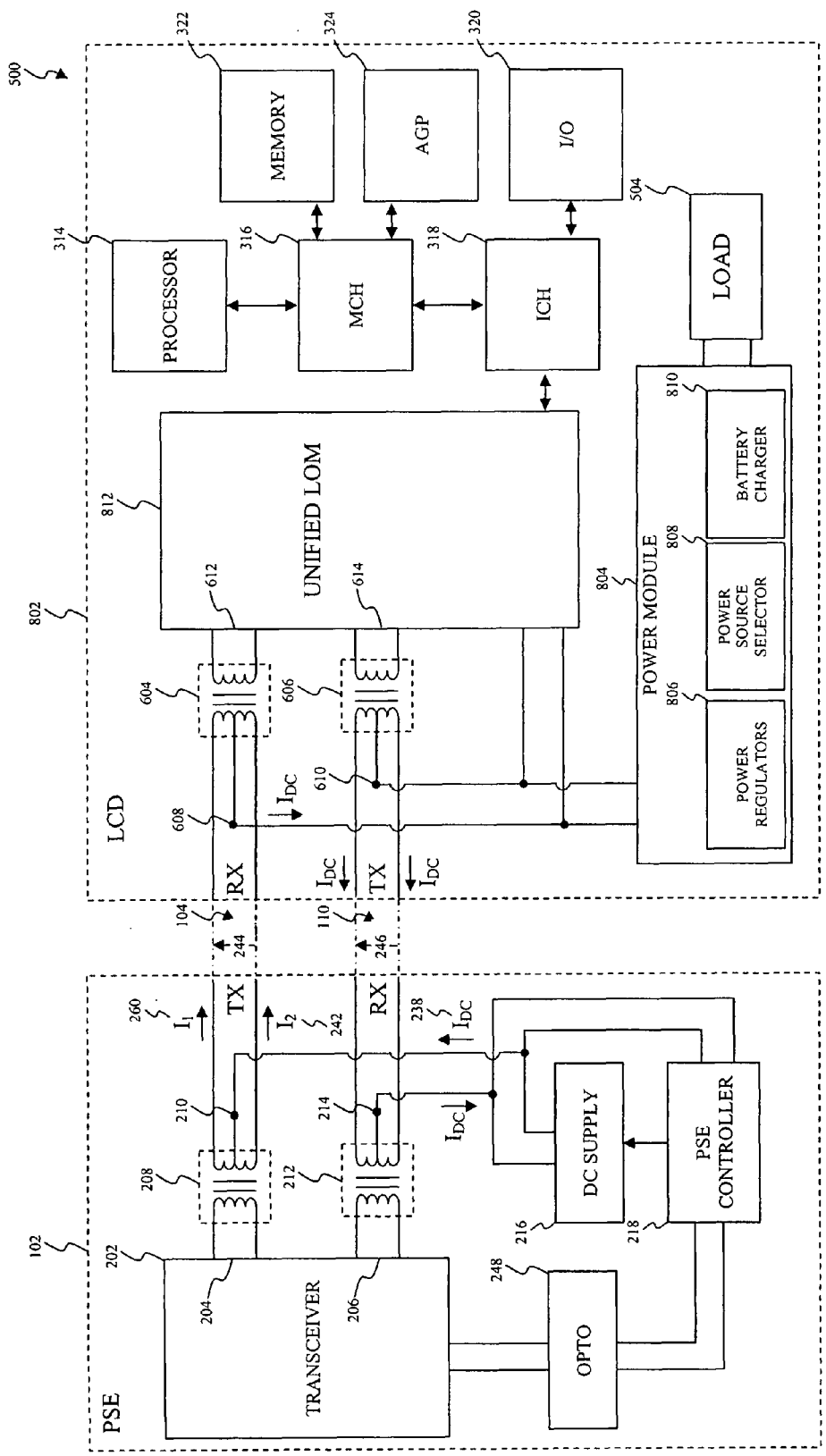
FIG. 8 illustrates a more detailed figure of the power transfer from a power source equipment (PSE) to a laptop computing device (LCD) according to an exemplary embodiment of the present invention.

FIG. 8 illustrates a more detailed figure of the power transfer from a power source equipment (PSE) to a laptop computing device (LCD) according to an exemplary embodiment of the present invention. More specifically, FIG. 8 provides a more detailed circuit diagram of the PoE system 500, where the power source equipment 102 provides PoE and data communications to a laptop computing device (LCD) 802 over conductor pairs 104 and 110. In this exemplary embodiment, the power source equipment 102 provides PoE and data over conductor pairs 104 and 110 in a substantially similar manner as previously described in FIG. 1 and FIG. 2.

As shown in FIG. 8, the laptop computing device 802 includes a unified LOM 602. The operation and implementation of the unified LOM 602 is previously described above in FIG. 6A through FIG. 7. The LCD 802 also includes a PoE power module 804. The PoE power module 804 can include, for example, power regulator 806, a power source selector 808, and a battery charger 810. A power regulator 806 may be optionally inserted before the load 504 to step down the voltage as necessary to meet the voltage requirements of the LCD 802. Further, multiple power regulators 806 may be arrayed in parallel to output multiple different voltages (3 volts, 5 volts, 12 volts) to supply different loads 504 to the LCD 802. Power, such as the direct current ($I_{DC}$) 238, can be delivered to the battery charger 810 within the PoE power module 804, in order to charge a battery, for example.

Figure 9:
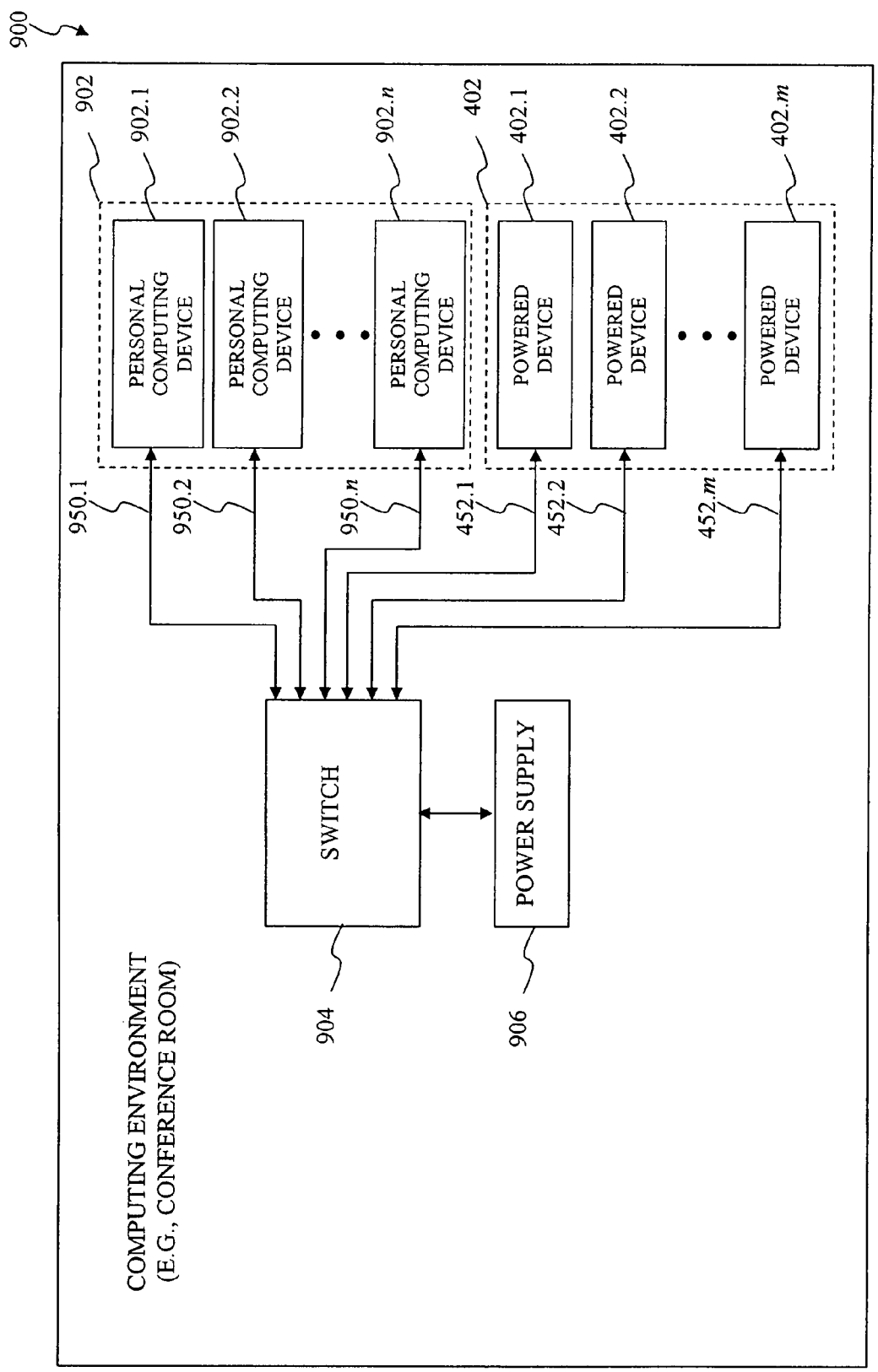
FIG. 9 illustrates a Power over Ethernet (PoE) configuration in a computing environment, according to an exemplary embodiment of the present invention.

FIG. 9 illustrates a Power over Ethernet (PoE) configuration in a computing environment, according to an exemplary embodiment of the present invention. A computing environment 900 includes personal computing devices 902.1 through 902.n, hereinafter referred to as the personal computing devices 902 and the powered devices 402. Computing environment 900 can be a conference room, for example, or any other environment in which the personal computing devices 902 are networked. The personal computing devices 902 include any suitable device, such as a the personal computing device (PCD) 702, the laptop computing device (LCD) 802, or any other suitable device that receives power for PoE and for data communications over a communications link.

As shown in FIG. 9, a power supply 906 provides prove for PoE and for data communications to the personal computing devices 902 and to the powered devices 402 via a network switch 904. The network switch 904 may be any networking switch that is capable of providing PoE and data communications to the personal computing devices and/or the powered devices. The network switch 904 includes one or more data ports to provide PoE and data communications to the personal computing devices and/or the powered devices. The network switch 904 may have as little as two data ports or as many as 400 or more data ports.

The network switch provides power for PoE and for data communications to the personal computing devices 902 through a corresponding interface 950.1 through 950.n, hereinafter referred to as the interface 950. Those skilled in the art(s) will recognize that the interface 950 may include any communication link that can handle PoE, such as various types of Ethernet cabling, for example. Similarly, the network switch 904 provides PoE and data communications to the powered devices 402 through the interface 452.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A personal computing device (PCD) for a Power-over-Ethernet (PoE) system, comprising:
   a unified LAN-On-Motherboard (LOM) including a LOM and a Powered Device (PD) Controller,
   wherein the PD Controller is configured to monitor an operational parameter of the PCD and to provide the operational parameter to the LOM, and
   wherein the LOM includes a receive port and a transmit port, the receive port being configured to receive a first data communication including direct current (DC) power, the transmit port being configured to transmit a second data communication including the operational parameter.

2. The PCD of claim 1, wherein the first data communication is received from a power source equipment (PSE) and the second data communication is transmitted to the PSE.

3. The PCD of claim 1, wherein the operational parameter includes at least one of a group consisting of:
   an operating voltage of the PCD;
   an operating current of the PCD; and
   an impedance signature of the PCD.

4. The PCD of claim 1, further comprising:
   a processor, coupled to the unified LOM, to execute an operating system, wherein the operating system, when executed, controls the PCD using a layer two data link layer communication.

5. The PCD of claim 1, wherein the transmit port is configured to transmit the second data communication using a layer two communication from an Open System Interconnection (OSI) networking model.

6. The PCD of claim 1, further comprising:
   a first transformer coupled to the receive port; and
   a second transformer coupled to the transmit port.

7. The PCD of claim 6, wherein the DC power includes a first DC current and a second DC current and the first transformer combines the first DC current and the second DC current to produce a direct current.

8. The PCD of claim 7, wherein the second transformer splits the direct current into the first current and the second current.

9. The PCD of claim 8, wherein the second data communication further includes the direct current.

10. The PCD of claim 1, further comprising:
    an Input/Output Controller Hub (ICH) coupled between a processor and the unified LOM.

11. The PCD of claim 10, further comprising:
    a Memory Controller Hub (MCH) coupled between the processor and the ICH.

12. A laptop computing device (LCD) for a Power-over-Ethernet (PoE) system comprising:
    a unified LAN-On-Motherboard (LOM)) including a LOM and a Powered Device (PD) Controller,
    wherein the PD Controller is configured to monitor an operational parameter of the LCD and to provide the operational parameter to the LOM, and
    wherein the LOM includes a receive port and a transmit port, the receive port being configured to receive a first data communication including direct current (DC) power, the transmit port being configured to transmit a second data communication including the operational parameter; and
    a power module configured to charge a battery using the DC power.

13. The LCD of claim 12, wherein the first data communication is received from a power source equipment (PSE) and the second data communication is transmitted to the PSE.

14. The LCD of claim 12, wherein the operational parameter includes at least one of a group consisting of:
    an operating voltage of the LCD;
    an operating current of the LCD; and
    an impedance signature of the LCD.

15. The LCD of claim 12, further comprising:
    a processor, coupled to the unified LOM, to execute an operating system, wherein the operating system, when executed, controls the LCD using a layer two data link layer communication.

16. The LCD of claim 12, wherein the transmit port is configured to transmit the second data communication using a layer two communication from an Open System Interconnection (OSI) networking model.

17. The LCD of claim 12, further comprising:
    a first transformer coupled to the receive port; and
    a second transformer coupled to the transmit port.

18. The LCD of claim 17, wherein the DC power includes a first DC current and a second DC current and the first transformer combines the first DC current and the second DC current to produce a direct current.

19. The LCD of claim 18, wherein the second transformer splits the direct current into the first current and the second current.

20. The LCD of claim 19, wherein the second data communication further includes the direct current.

21. The LCD of claim 12, further comprising:
    an Input/Output Controller Hub (ICH) coupled between a processor and the unified LOM.

22. The LCD of claim 21, further comprising:
    a Memory Controller Hub (MCH) coupled between the processor and the ICH.

23. A personal computing device (PCD) for a Power-over-Ethernet (PoE) system, comprising:
    a unified LAN-On-Motherboard (LOM) including a LOM and a Powered Device (PD) Controller,
    wherein the PD Controller is configured to monitor an operational parameter of the PCD and to provide the operational parameter to the LOM, and
    wherein the LOM is configured to transmit a data communication including the operational parameter.

24. The PCD of claim 23, wherein the data communication is transmitted to a power source equipment (PSE).

25. The PCD of claim 23, wherein the operational parameter includes at least one of a group consisting of:
    an operating voltage of the PCD;
    an operating current of the PCD; and
    an impedance signature of the PCD.

26. The PCD of claim 23, further comprising:
    a processor, coupled to the unified LOM, to execute an operating system, wherein the operating system, when executed, controls the PCD using a layer two data link layer communication.

27. The PCD of claim 23, wherein the unified LOM is configured to receive a second data communication, the second data communication including direct current (DC) power.

28. The PCD of claim 23, wherein the transmit port is configured to transmit the data communication using a layer two communication from an Open System Interconnection (OSI) networking model.

* * * * *